Nov. 3, 1970

J. M. HERRING, JR  3,537,745

AIRCRAFT TRANSFER VEHICLE

Filed Sept. 25, 1968

INVENTOR.
James M. Herring, Jr.

BY

William R. Nolte

AGENT

Nov. 3, 1970  J. M. HERRING, JR  3,537,745
AIRCRAFT TRANSFER VEHICLE
Filed Sept. 25, 1968  8 Sheets-Sheet 2

INVENTOR.
James M. Herring, Jr.
BY
William R. Nolte
AGENT

Nov. 3, 1970  J. M. HERRING, JR  3,537,745
AIRCRAFT TRANSFER VEHICLE
Filed Sept. 25, 1968  8 Sheets-Sheet 7

FIG.8

INVENTOR.
James M. Herring, Jr.
BY
William R. Nolte
AGENT

Nov. 3, 1970   J. M. HERRING, JR   3,537,745
AIRCRAFT TRANSFER VEHICLE
Filed Sept. 25, 1968   8 Sheets-Sheet 8

FIG. 9
FIG. 11
FIG. 10

INVENTOR.
James M. Herring, Jr.
BY
William R. Nolte
AGENT

United States Patent Office 3,537,745
Patented Nov. 3, 1970

3,537,745
AIRCRAFT TRANSFER VEHICLE
James M. Herring, Jr., Merion Station, Pa. (% The Budd Company, 2450 Hunting Park Ave., Philadelphia, Pa. 19132)
Filed Sept. 25, 1968, Ser. No. 762,443
Int. Cl. B62d 31/02
U.S. Cl. 296—28
4 Claims

ABSTRACT OF THE DISCLOSURE

A vehicle to transfer passengers between an airport terminal and parked aircraft. The vehicle includes a chassis and a passenger pod, the pod capable of being elevated to the floor level of airport terminals. Buffer means associated with the pod provide interfacing with the aircraft. The vehicle normally travels with the pod in the down position but is elevated when loading or unloading passengers. The pod contains a loading ramp which is extended to contact the aircraft or terminal building.

---

Mobile flight lounge vehicles have heretofore been used to transfer passengers between airport terminal docks and parked aircraft. A disadvantage of such vehicle has been that it was necessary for passengers to first descend stairs from the airport terminal dock to ground level, walk a distance along the ground and then ascend into the vehicle. Its stairway would be folded and stowed away and the mobile vehicle would then move to the parked aircraft. The vehicle stairway would be lowered into position and the passengers would thereafter descend before climbing into the parked aircraft. The disembarked passengers from the parked aircraft would then be carried back to the terminal dock in the same manner.

Accordingly it is an object of the present invention, therefore, to provide an improved aircraft passenger transfer vehicle which avoids one or more of the disadvantages of the prior art arrangements.

It is a further object of this invention to provide a vehicle which enables the transfer of passengers between an airport terminal dock and a parked aircraft while eliminating the ground level loading of passengers, thereby precluding the need for passengers to climb and descend stairways.

It is still another object of this invention to provide an improved vehicle which will enable interfacing engagement with parked aircraft and an airport terminal building.

In accordance with the invention an improved mobile vehicle is provided to transfer passengers or freight between an airport terminal and a parked aircraft. The vehicle includes a pod which is mounted for slidable movement on a pair of vertical posts which are secured to the chassis of the vehicle. Power means are mounted on the chassis and are operable to selectively move the pod to any height to match the door sill of the aircraft or the floor of the terminal building.

For a better understanding of the present invention together with other and further objects thereof, reference is had to the following description taken in connection with the accompanying drawings and its scope will be pointed out in the appended claims.

Figure 1:
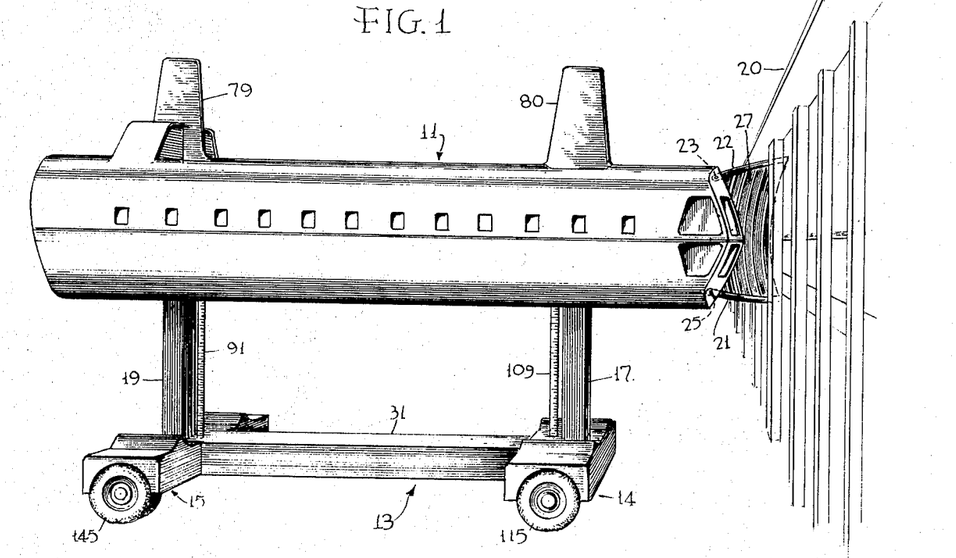
FIG. 1 is an elevational view of the vehicle embodying the invention shown positioned at a terminal building of an airport.
Figure 2:
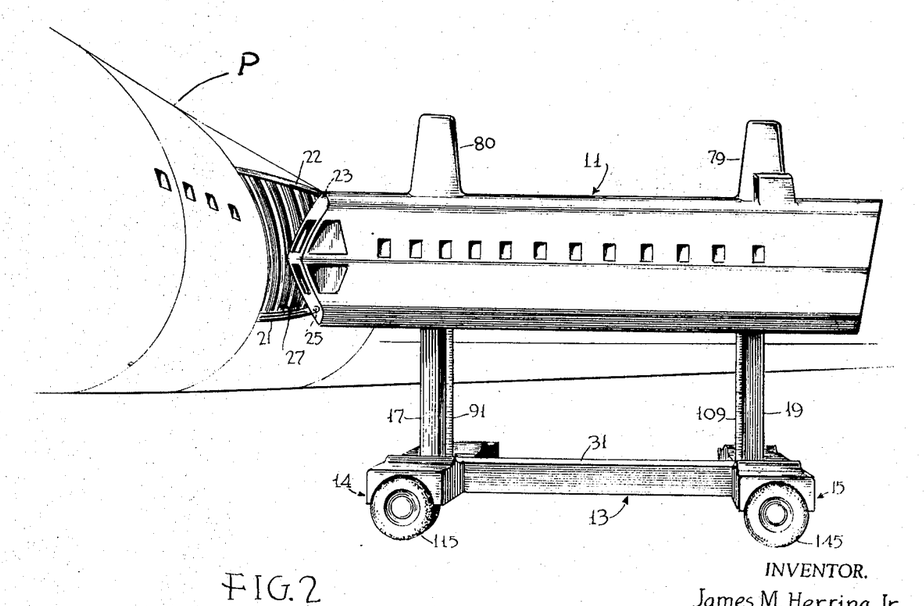
FIG. 2 shows the vehicle in a position servicing a parked aircraft.

Referring now to FIG. 1 of the drawing, there is shown a passenger vehicle, partly schematic of a complete passenger or freight carrying vehicle of the type embodying the invention. The vehicle 10 is shown as including a passenger or freight pod 11, a chassis 13 connected to a front axle unit 14 and a rear axle unit 15. The chassis includes a front lifting post 17 and a rear lifting post 19, both of hollow sleeve construction, each secured along the longitudinal axis of the chassis. The pod 11 is mounted for vertical movement, up and down, to match the height of the door sill of the floor of an airport terminal dock 20, or as shown in FIG. 2 the door sill height of a parked aircraft P. The vehicle includes a ramp structure 21 which may be extended from the pod to interface either the aircraft or the terminal building. The ramp structure includes an upper clam shell door 22 hinged as at 23 and a lower clam shell door 24 hinged as at 25. Side curtain members 27 extend between the upper and lower doors and are folded back within the pod when the clam shell doors are hinged to their retracted position.

Figure 3:
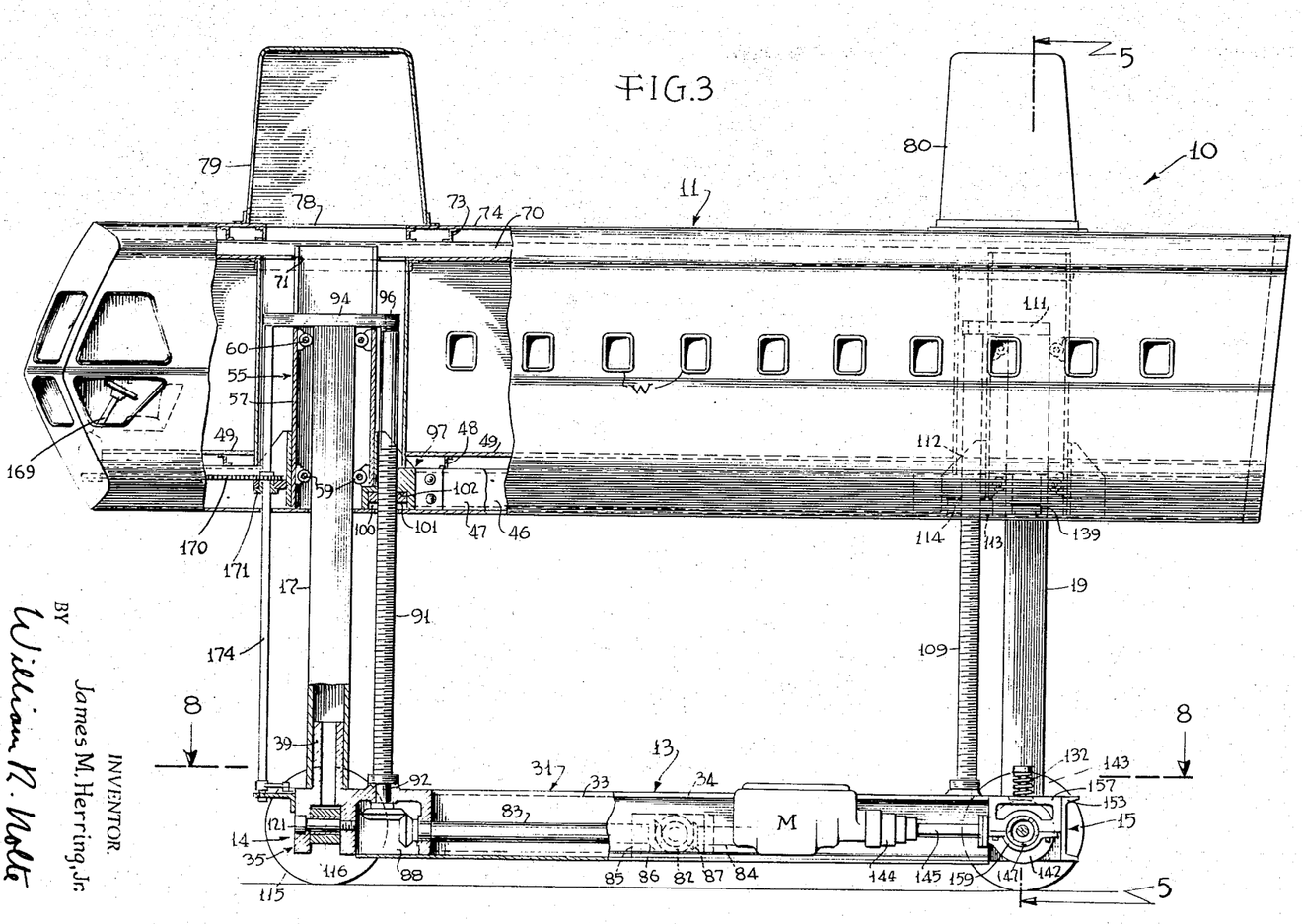
FIG. 3 is a longitudinal sectional view taken through the vehicle of FIG. 2 and shown partly in section and partly schematic.
Figure 3A:
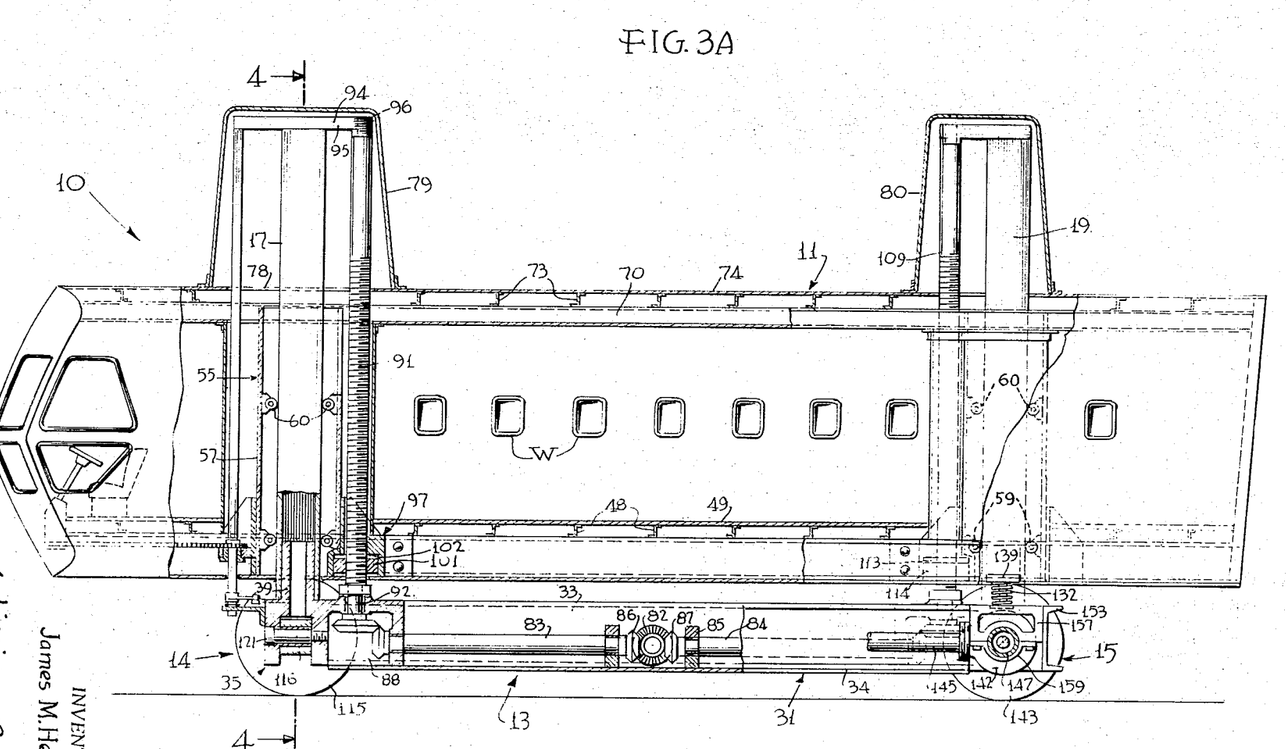
FIG. 3A is a view similar to FIG. 3 but showing the pod in its lowered position.
Figure 8:
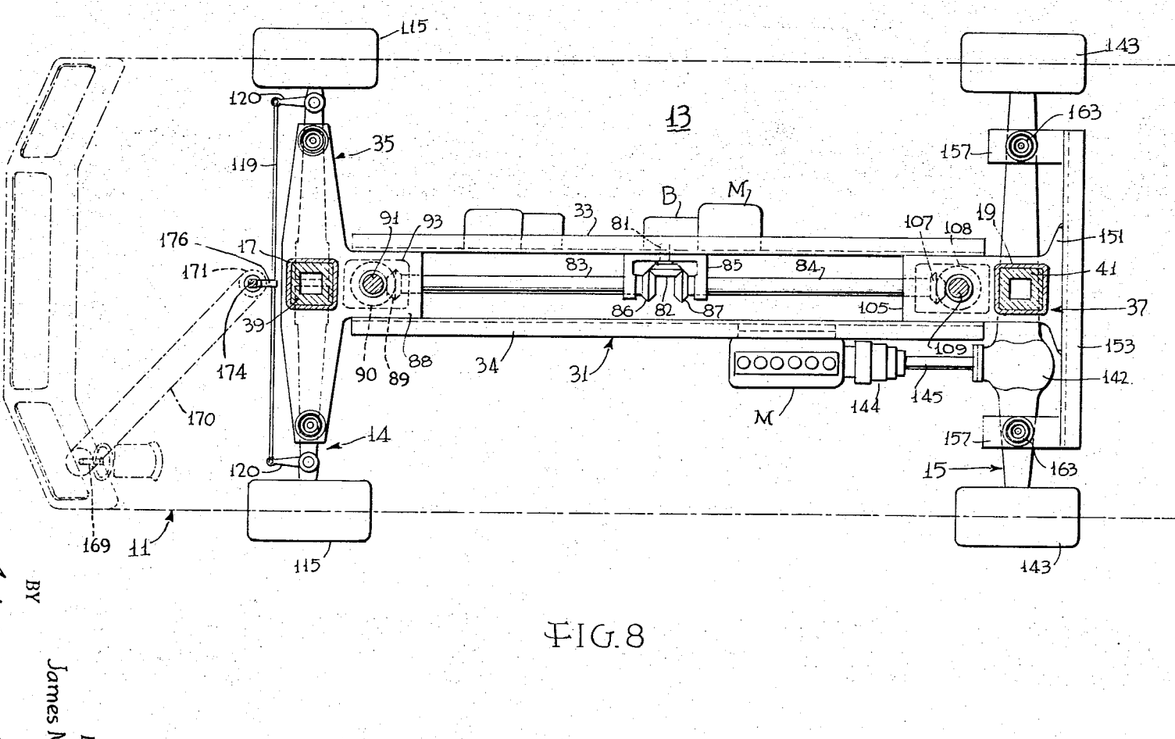
FIG. 8 is a sectional view taken along the lines 8—8 of FIG. 3, the pod shown in phantom lines.

Referring now to FIGS. 3 and 3A, it is seen that the chassis 13 includes a longitudinal torque tube 31 extending between the front and rear axle units as seen in FIG. 8 and disposed along the central longitudinal axis of the vehicle. The torque tube 31 includes a pair of spaced apart channel members 33, 34 which sandwich a front housing 35 and a rear housing 37 therebetween. The front housing 35 which may be suitable casting includes a centrally located upright portion 39 which is received within the hollow sleeve portion of the front lifting post 17. The rear housing which may be of similar construction likewise includes an upright hollow portion 41 received within the interior of the rear lifting pole 19. The upper portions of the lifting posts 17 and 19 are unrestrained relative to the longitudinal torque tube 13. Any wind load or other lateral forces applied to the pod 11 are reflected in bending deflections of the posts. In order to minimize such deflections the upright portions 39 and 41 of the front and rear casting housing may vary in cross-sectional area and may extend to a desired height so as to provide the required rigidity of the lifting poles.

Figure 6:
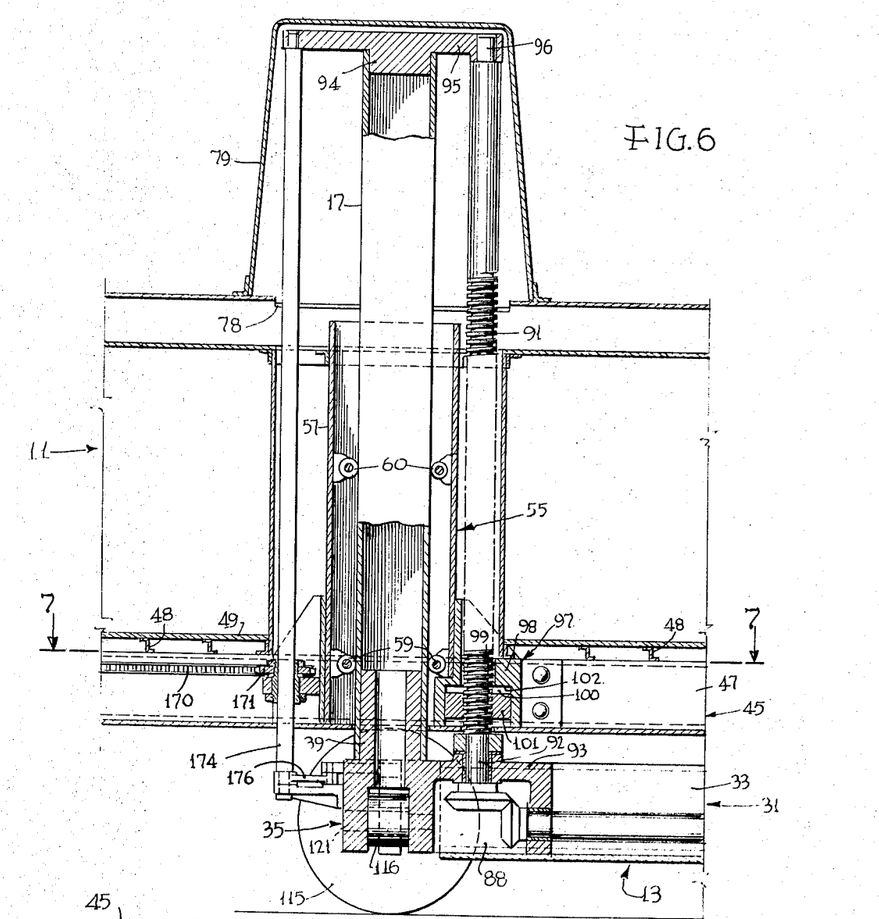
FIG. 6 is a sectional view taken along the lines 6—6 of FIG. 4.
Figure 7:
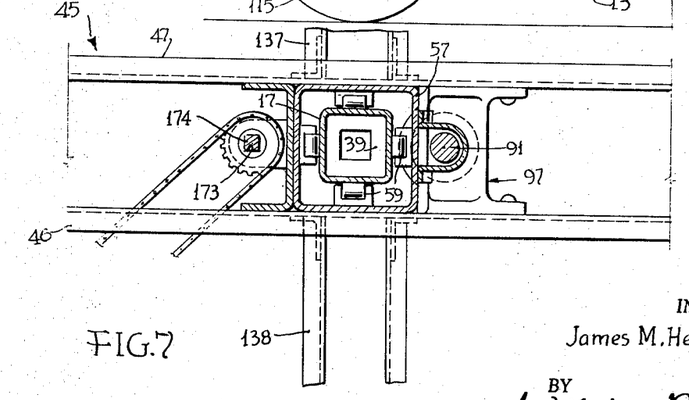
FIG. 7 is a sectional view taken along the lines 7—7 of FIG. 6.

Referring now to FIGS. 6 and 7 it is seen that the vertical lifting pole 17 is of hollow construction and rectangular in cross-section. The pod 11 is shown as including a longitudinal center sill frame means 45 which consists of channel members 46 and 47 disposed in back to back relationship. Suitable transverse floor beam members 48 are disposed transversely to the channel member and support floor panels 49 to carry the passengers above. In order to permit vertical travel of the pod 11 from the position shown in FIG. 6 to that shown in FIG. 3 suitable guide means 55 are provided. The guide means include an enlarged rectangular sleeve 57. The sleeve is disposed vertically, and its base portion is gripped in sandwiched relationship between the aforementioned channel members 46, 47 defining the center sill of the pod. A plurality of roller means, 59 lower, and 60 upper, are provided interiorly of the sleeve member 55. The rollers 59, 60 are mounted by suitable means to the interior flat surfaces of the sleeve member 57 and ride on the external surfaces of lifting pole 17.

Figure 4:
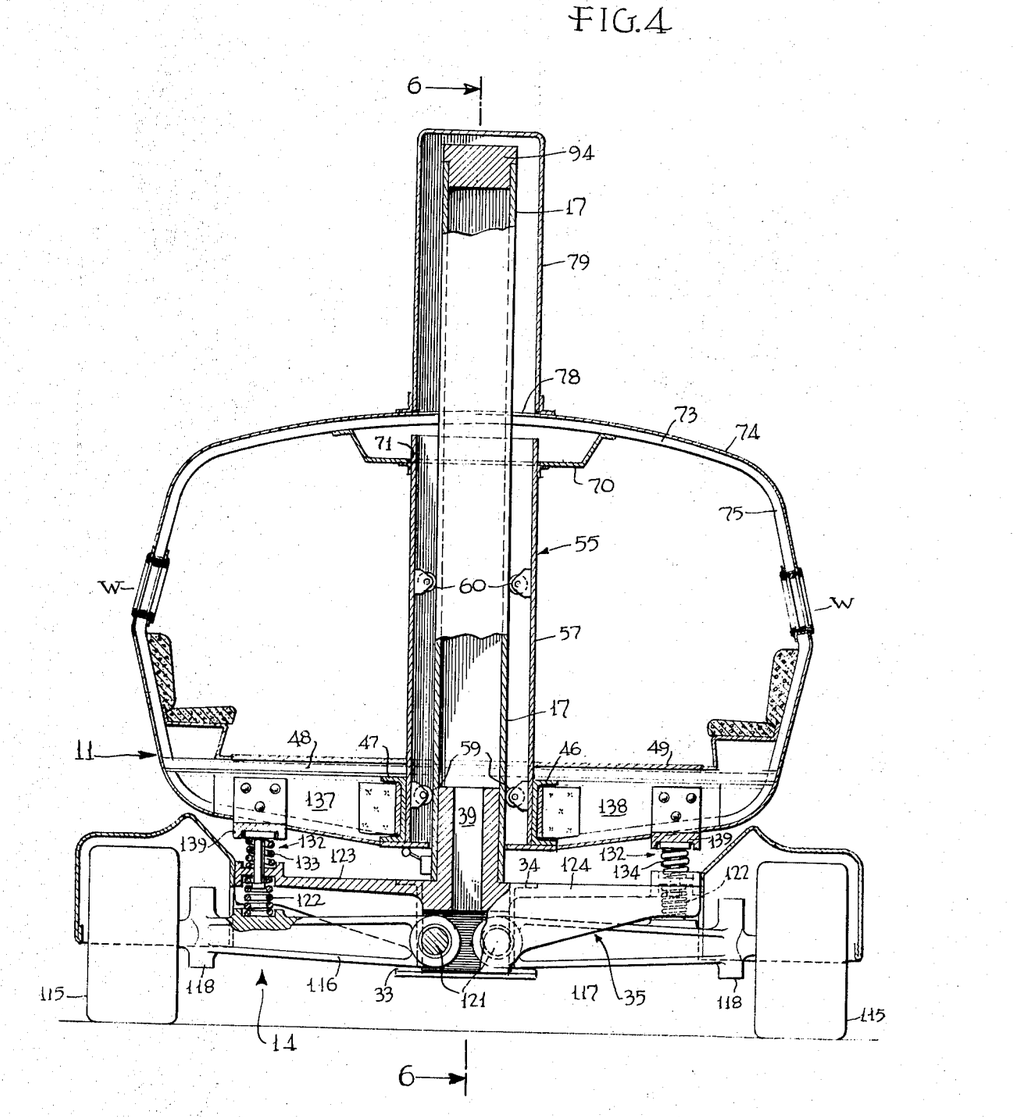
FIG. 4 is a sectional view taken along the lines 4—4 of FIG. 3A.
Figure 5:
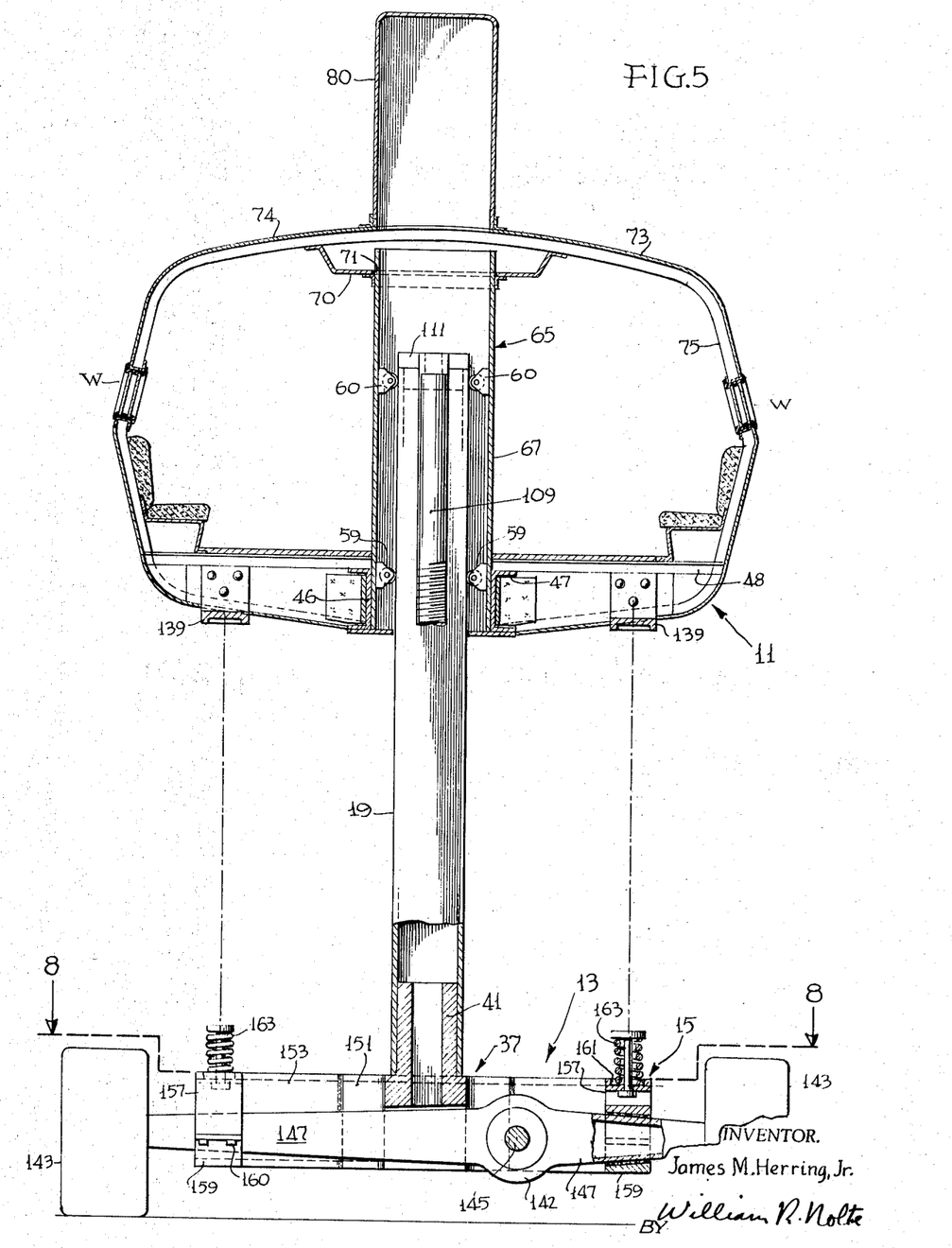
FIG. 5 is a sectional view taken along the lines 5—5 of FIG. 3.

With reference now to FIG. 5 it is likewise observed that the rear lifting post 19 is traversed by similar rear guide means 65. The latter include a rear sleeve member 67 also rectangular in cross-section with lower rollers 59, upper rollers 60 disposed interiorly of the sleeve. The front sleeve member 57 and the rear sleeve member 67 are suitably joined by longitudinal upper roof channel member 70 which is suitably apertured as at 71, FIG. 4 to permit the passage of sleeve members 57 therethrough. The member 70 also facilitates the passage of air conditioning and lighting facilities therethrough. The aforementioned longitudinal channel member 70 is suitably secured to transverse roof carlin members 73 which in turn support a roof sheating 74 thereabove. Suitable side frames 75 connect the roof elements 74 to the floor framing and may include windows as indicated at W. The lifting poles 17, 19 are of greater height than the height of the pod. In order to permit the passage of the top of the lifting poles 17 and 19 through the roof structures of the pod the latter include openings at 78 to enable the upper portions of the poles to project above the roof surface. See FIGS. 3 and 6. When the pod is in its lowered position as illustrated in FIGS. 3A and 6, the projecting upper portions of the lifting poles are concealed by means of shroud members 79 and 80. These members cap the openings to seal the roof from the weather and constitute a faring for the upper projecting end portions of the poles.

With reference now to FIGS. 3, 3A and 8, power means M are shown mounted on the longitudinal torque tube assembly 31. The power means are operable selectively independently from a cab portion provided in the forward portion of the pod to move the pod vertically relative to the lifting poles 17 and 19 respectively. For this purpose the power means M is shown connected to a suitable gear box and brake B to drive a stub shaft 81 carrying a pinion gear 82 thereon. A pair of horizontally aligned drive shafts 83, 84 are suitably journalled at each of their inboard ends by means of a centrally located housing 85 which is affixed to channel member 33 of the torque tube 31. The inboard end of shaft 83 includes a bevel gear 86 which meshes with drive gear 82. In a similar manner shaft 84 includes a bevel gear 87 likewise meshing with gear 82. The forward end of shaft 83 is journalled for rotation in the rear hollow-walled portion 88 of housing 35 and includes a bevel gear 89 at its end. A vertical shaft 91 is journalled as at 92 in the top wall 93 of the hollow casting portion 88. The shaft 91 includes a bevel gear 90 at its bottom and which meshes with bevel gear 89 and is threaded along its length, and is suitably supported for rotation in parallel relationship with lifting pole 19. For this purpose an upper fitting 94 is received in the top end of the lifting pole 17. The fitting 94 includes a rearwardly extending extension 95 which provides a journal 96 of the upper end of shaft 91. The center sill members 46, 47 of the floor of the pod secure a bulkhead housing 97 through which the lower end lifting screw 91 passes. The fitting 97 is suitably secured to the longitudinal center sill members.

The bulkhead housing 97 includes a top wall 98 with an opening 99 through which drive shaft 91 passes. The opening 99 is large enough to permit free rotation of shaft 91. The housing 97 further includes a cavity 100 to receive nut means 101 therein. The cavity 100 is of a size and shape to permit relative vertical movement of the nut means 101 to the fitting 97. The nut means 101 do not rotate in the cavity. When the shaft 91 is rotated in one direction the nut means 101 are caused to engage the bottom surface 102 of the top wall portion 98 of the casing and thereby exert an upward force through the fitting to lift the pod relative to the chassis. When the shaft 91 is rotated in an opposite direction however the lifting nut means 101 are caused to back away from the lifting surface 102 and thereby relieve the load on the shaft 91.

Still referring to FIGS. 3 and 8, the weight of the rear portion of the pod may be lifted relative to lifting pole 19 in a similar manner. For this purpose the rear horizontal drive shaft 84 is suitably journalled in the end wall 105 of housing 37. The rear end of the shaft 84 includes a bevel gear 107 which meshes with bevel 108 affixed to the lower extremity rear vertical drive shaft 109. The lower end of the shaft 109 is suitably journalled in the casing 37 and its upper end is received in a fitting 111 which in turn is secured to the top of lifting pole 19 in a manner similar to that previously described with respect to fitting 94 associated with the front lifting pole 17. A rear bulkhead lifting fitting or housing 112 is provided in the rear portion of the pod similar to the forward fitting 97. The fitting constitutes lifting plate means and is suitably secured to the rear portion of the center sill and enables the transfer of vertical forces from screw 109 to lift the pod along pole 19. A captive nut means 114 are received within a lower cavity portion 113 of the fitting. When horizontal shafts 83, 84 are driven in unison, the front and rear lifting screws 91 and 109 respectively are rotated and are effective to impart axial movement to their captive nut means 101 and 114, to cause the pod to traverse the lifting poles 17, 19 respectively. In this manner the pod is capable of being elevated to the floor level of most present and proposed aircraft and the second floor level of most present and proposed airport terminals.

With reference now to FIGS. 4, 9, 10 and 11, the front wheel axle unit 14 includes wheels 115 secured respectively to axle units 116, 117 by means of conventional kingpin joints 118. The wheels may be suitably rotated by steering rod 119 operating through links 120. The inboard ends of axles 116 and 117 are pivoted by pins 121, adjacent to longitudinal center line of the torque tube of the chassis. In order to absorb road vibration and shock as the vehicle travels along the air-field, spring suspension means 122 are interposed between the chassis frame and the axle units 116 and 117. For this purpose the front casting unit 35 which interconnects the upright pole 17 to the longitudinal torque tube 13 is provided with a pair of laterally offset arm portions 123 and 124. The latter arm portions are of inverted U-shape in cross-section and extend above the top surfaces of the axle segments 116 and 117. In the present instance the spring means 122 constitute coil spring elements 125 which are interposed between the top surfaces of axle segments 117 and the lower under surface of laterally extending arms 123, 124. Since each of the axle segments 116, 117 is independently pivoted, each segment may thus independently function to pivot about its respective pivot post 121 to absorb individual road shocks.

Figure 9:
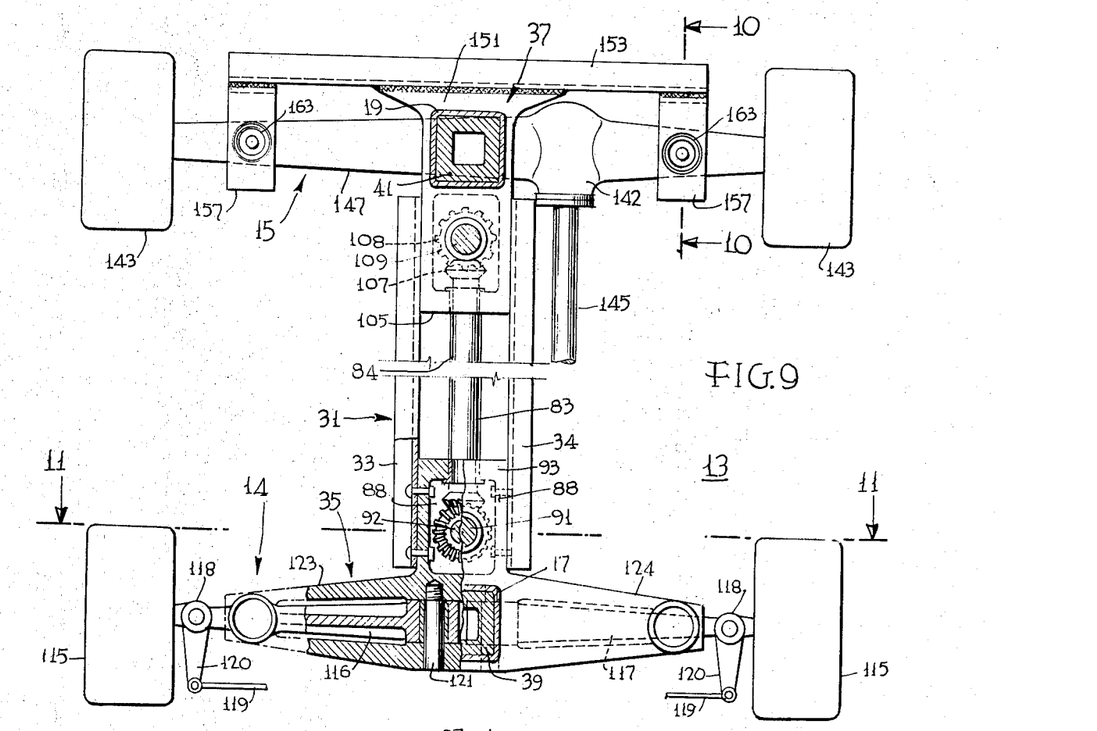
FIG. 9 is a view similar to FIG. 8 but showing the front and rear axle units in partial section.
Figures 10, 11:
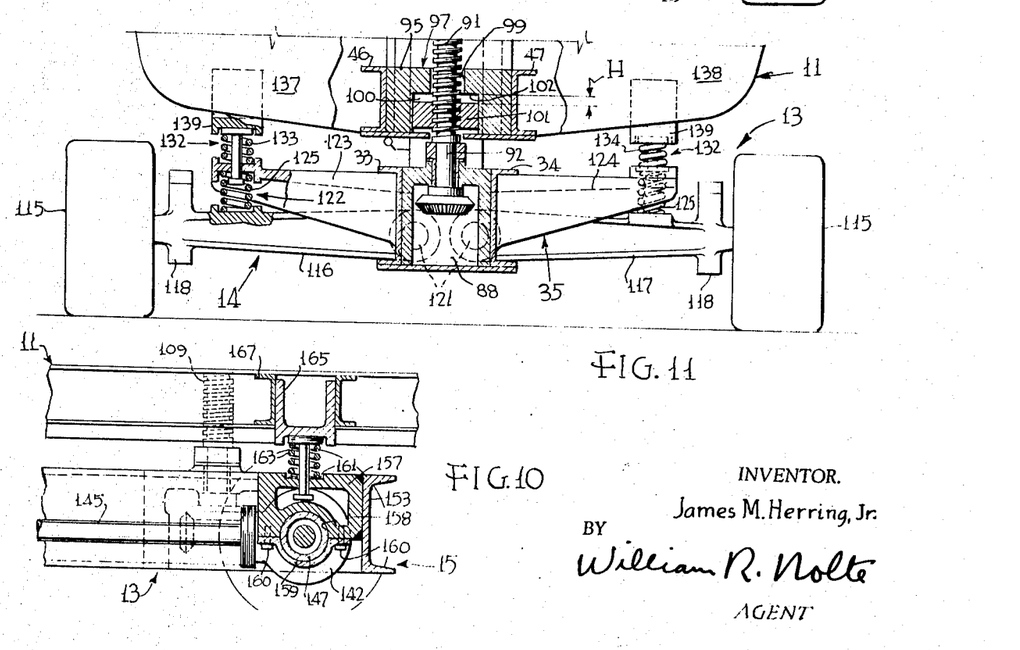
FIG. 10 is a sectional view taken along the lines 10—10 of FIG. 9.
FIG. 11 is a view taken along the lines 11—11 of FIG. 9.

As previously mentioned the vehicle 10 normally travels with the pod 11 in its down position as illustrated in FIG. 4. Resilient cushion means 132 are provided to resiliently transfer the weight of the pod to the chassis. As best seen in FIGS. 4, 9 and 11 it is noted that the cushion means 132 include coil spring means 133, 134 interposed between the outer ends of transverse arm portions 123 and 124 respectively of casting member 35, and the lower bulkhead framing members 137 and 138 of the pod 11. The latter bulkhead members 137, 138 include additional angle supports 139 to provide a seat for the top convolutions of the springs. When the lifting screw 91 is rotated so that the pod is in its lowered position, the lifting nut means is run free of the pod floor as indicated by the distance H. In this position of the nut, the weight of the pod is supported on the springs 133, 134 and 163 respectively. Since the vehicle normally travels in the lower position of the pod as illustrated in FIG. 11 so it is thus apparent that the dynamic load of travel is not supported by the fore and aft lifting screws 91 and 109.

Referring to FIGS. 8 and 9, the rear wheel axle unit 15 includes a differential drive unit 142 and drive wheels 143. The power to drive the differential unit is provided from motor M through a suitable torque converter and transmission 144 and then through drive shaft 145 to the differential unit 142. The latter unit includes a rear differential axle housing 147 which extends laterally outwardly from the torque tube 31 and supports the weight of the rear portion of the pod and chassis. The rear lifting pole housing 37 includes a T shaped rearwardly extending extension 151 to which a transverse channel member 153 is affixed as by welding. The I beam or channel member 153 extends laterally outwardly and its outer ends terminate short of the wheels 143. Tie blocks 157 are secured to the outer ends of member 153. See FIG. 10. The lower portion of the tie block 157 is arcuately curved as indicated at 158 to engage the top surface of the differential axle housing 147. A lower curved clamping member 159 is suitably fastened to the tie block 157 as by bolts 160 to rigidly secure the differential housing 147 to the transverse channel frame member 153. The upper portion of the tie block 157 is recessed as at 161 to provide a seat for spring 163 which is received in a recessed fitting 165 which in turn is gripped between spaced channel bulkhead members 167 of the pod underframing. It is thus observed that when the lifting screws 91 and 109 are rotated to their retracted positions their respective lifting nuts 101 and 114 relieve the loading on the lifting screws 91, 109 and thereby enable the load of the pod to be transferred to the forward suspension springs 133 and 134 and the rear differential springs 163.

With reference now to FIGS. 3 and 7 it is noted that vehicle is operated by an operator, not shown, in the forward end of the vehicle. Steering control is provided by a steering wheel 169 which at its base actuates chain 170 which in turn rotates sprocket 171 suitably mounted for rotation in the floor of the vehicle. The sprocket is centrally apertured as at 173 to receive vertical shaft 174. The lower end of the shaft is journalled for rotation to the forward end of housing 35 by bracket 175 and has affixed thereto an arm 176 which connected to the aforementioned steering rod 119. Rotation of the steering wheel 169 is effective to rotate arm 176 to thereby move rod 119. During vertical movement of the pod, the sprocket 171 with its square aperture 173 slides along the length of rod 174 which is rectangular in cross section. Similar control mechanism may be employed to control the throttle, brakes and the gear box of 144 of the vehicle.

It will be appreciated from the foregoing that although lifting screws have been utilized to cause the pod to slide up and down on the fore and aft vertical poles it should be obvious that alternate power lifting devices could be employed. For example, cables or chains or hydraulic cylinders could be used in lieu of the specific screw lifting arrangements shown in the foregoing figures.

While there has been shown what at present is considered to be the preferred embodiment of the invention it will be obvious to those skilled in the art that various changes and modifications may be made therein without departing from the invention and it is therefore aimed in the appended claims to cover all such changes and modifications as fall within the true spirit and scope of the invention.

What is claimed is:

1. An elongated vehicle for transporting passengers between an airport terminal area and an aircraft at a field location, comprising in combination, chassis means, wheel means mounted to said chassis means for movement along the ground, a pair of spaced upright post means rigidly affixed to said chassis means, pod means for carrying passengers extending between said pair of post means, means for moving said pod means along said post means, said post means extending through and beyond the interior of said pod means in one position of movement of said pod means along said post means, said pod means having frame means, sleeve means disposed between said frame means and surrounding said post means, and roller means mounted on said sleeve means to engage said post means.

2. An elongated vehicle for transporting passengers between an airport terminal area and an aircraft at a field location, comprising in combination, chassis means, wheel means mounted to said chassis means for movement along the ground, a pair of spaced upright post means rigidly affixed to said chassis means, pod means for carrying passengers extending between said pair of post means, means for moving said pod means along said post means, said chassis means including torque tube means disposed along the longitudinal axis of said vehicle, and pair of upright post means including a forward post and a rear post secured at opposite ends of said torque tube means, and resilient suspension means intermediate said pod means and said chassis means for supporting said pod means in a lowered position as the vehicle travels along the ground surface.

3. In the elongated vehicle as set forth in claim 2 wherein said means for moving said pod means include screw means journalled for rotation on said post means, nut means cooperating with said screw means to lift said pod means, said nut means being housed within and secured against rotation by said pod means.

4. In the elongated vehicle as set forth in claim 3 wherein said pod means include a cavity to receive said nut means, said nut means being slidable in said cavity to enable transfer of loads from said screw means to said suspension means.

References Cited
UNITED STATES PATENTS
| | | | |
|---|---|---|---|
| 2,778,674 | 1/1957 | Attendu | 296—28.1 |
| 3,093,210 | 6/1963 | Picard | 180—89 X |
| 3,457,876 | 7/1969 | Holder | 187—20 X |

FOREIGN PATENTS
| | | |
|---|---|---|
| 558,425 | 6/1957 | Belgium. |
| 923,554 | 7/1947 | France. |

LEO FRIAGLIA, Primary Examiner

J. A. PEKAR, Assistant Examiner

U.S. Cl. X.R.

187—25, 95; 214—512